March 2, 1971  O. V. JACKSON  3,567,342
MOBILE CLEANING UNIT
Original Filed Feb. 1, 1968  2 Sheets-Sheet 1

INVENTOR.
OTTO V. JACKSON
BY Watts, Hoffmann,
Fisher & Heinke
ATTORNEYS

March 2, 1971     O. V. JACKSON     3,567,342
MOBILE CLEANING UNIT

Original Filed Feb. 1, 1968     2 Sheets-Sheet 2

INVENTOR.
OTTO V. JACKSON
BY Watts, Hoffmann,
Fisher & Heinke
ATTORNEYS

United States Patent Office 3,567,342
Patented Mar. 2, 1971

3,567,342
MOBILE CLEANING UNIT
Otto V. Jackson, 600 Hemlock Road,
Chagrin Falls, Ohio 44022
Original application Feb. 1, 1968, Ser. No. 702,340, now Patent No. 3,481,544, dated Dec. 2, 1969. Divided and this application Aug. 27, 1969, Ser. No. 853,354
Int. Cl. F04b 21/00
U.S. Cl. 417—234                                   1 Claim

ABSTRACT OF THE DISCLOSURE

A mobile cleaning unit for providing a high pressure cleaning spray, comprising a van-type vehicle with a water storage tank, apparatus for selectively mixing liquid cleaner, and power spraying equipment. A separate power generating unit carried in the truck operates the spray. A gasoline motor for the generating unit is started from the vehicle electrical system and is supplied with fuel from the fuel system of the vehicle. The power spraying equipment is also operable from a source of electric current external to the vehicle through a reel and electric cable unit selectively connected through a control switch.

Figure 1:
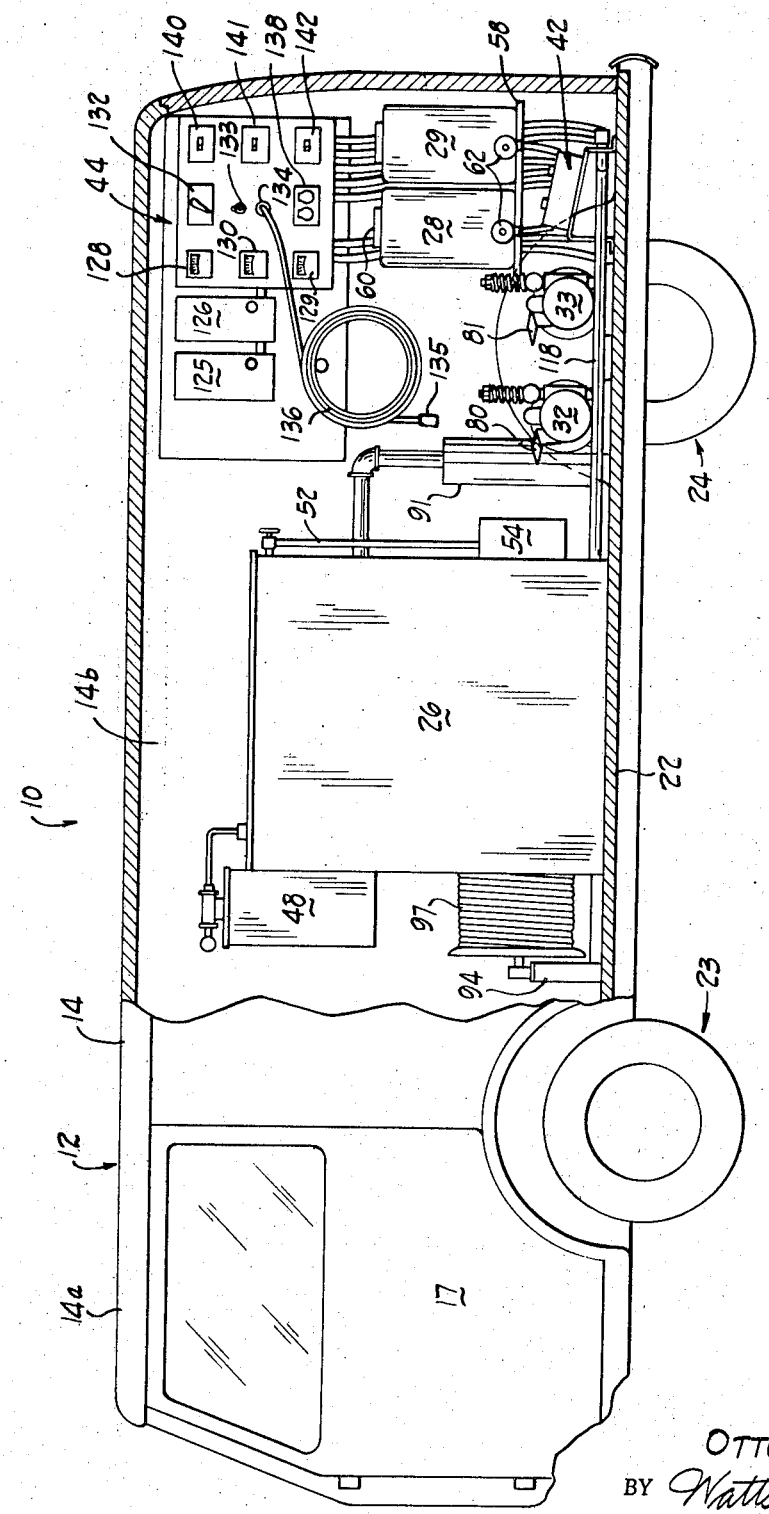

This application is a division of copending application Ser. No. 702,340, filed Feb. 1, 1968, now Pat. No. 3,481,-544.

This invention relates to a mobile cleaning unit and more particularly to a self-contained mobile cleaning unit for high pressure spray cleaning of large structures, such as mobile homes, truck fleets, automobiles and the like.

Typically, commercial cleaning and washing facilities are stationary and therefore not suitable for structures that are not mobile or conveniently moved. A definite need exists for an efficient, effective, and easily operated mobile cleaning unit that can be used for on-site cleaning operations. For example, it has been found much more economical to bring a self-contained cleaning unit to a fleet of trucks or cars than to transport the trucks and cars to a conventional car wash. Also, in the case of most mobile homes in use today, transportation of the homes is relatively inconvenient, yet otherwise the construction and the materials of which the mobile homes are made lend themselves to spray cleaning or washing techniques as used on trucks and cars. Many buildings are today also made of materials that are more suitably cleaned periodically than repainted. Moreover, even structures that require painting benefit from being washed prior to painting.

The present invention is a novel and improved mobile cleaning unit that meets the needs outlined above. It is compact and self-contained. That is, it carries its own water, cleaner, and the like, as well as power to produce a high pressure spray even with long hose lengths that are often necessary when large structures are being cleaned. Because relatively high pressures are attainable with pumps carried by the unit, cleaning is more effective and efficient than when existing on-site water pressure is utilized. Moreover, in many instances, a convenient water supply is not available at the site of the cleaning.

A relatively compact mobile van houses and carries the washing equipment, which is fixed within the van, except for one or more spray hoses and remote controls. Pumps driven by electric motors supply fluid under high pressure to a hose and spray nozzle. Electricity is generated either from a power unit in the truck or is supplied from a source of current external to said vehicle to operate the pumps that provide a high pressure spray. Connection to an external source of current is made through a reel and electric cable unit carried by the vehicle, which is selectively connected to the pump motor by a control switch.

Provision is made for mixing liquid cleaner with water as the water is drawn from a storage tank carried by the truck. The mixing of cleaning liquid is selectively controlled by a remote switch that permits the operator to select either cleaning liquid or rinsing liquid while applying a spray to a structure being cleaned, without returning to the truck. Three separate fluid outlets with hose couplings are provided. Two permit separate sprays to be used simultaneously and a third supplies fluid at twice the volume and the same pressure as the other two. An arrangement can also be provided so that one spray can use cleaning liquid while the other does not.

Positive displacement pumps are used to provide the high pressure liquid spray. Unloader valves are provided with the pumps to permit operation of the pumps while the spray outlet is turned off. This affords flexibility of operation without overloading the pumps and driving motors.

The water storage tank carried by the van is positioned so that the weight of the water is relatively evenly distributed beween the vehicle axles. The tank includes a plurality of baffles that prevent sloshing of the liquid during movement of the truck. A float controlled inlet valve provides an automatic shut-off to prevent overfilling of the tank. Resistance-type electrical heaters maintain the temperature of liquid within the tank, so that liquid at a suitable emperature when the tank is filled does not become cold during transit to the cleaning site when ambient temperatures are relatively low, as during the winter season in northern climates. Thus, by prefilling the tank with relatively warm liquid, the liquid can be maintained at a temperature that will avoid freezing during the application of the liquid, without the necessity of having a relatively high capacity heater in the tank.

The required apparatus is arranged within a load carrying portion of the van or truck for convenient access from the outside and for efficient weight distribution so that the van can be safely driven. Connections are provided from the electrical and fuel systems of the truck to supply current and fuel to the gasoline engine and gasoline engine starter for operating a generator that supplies the current to the electric motors of the pumps. This arrangement not only provides a great convenience, but also avoids unnecessary duplication of equipment.

The mobile unit of the present invention permits a single operator with a relatively compact truck to service entire fleets of trucks and cars, and to clean mobile homes in trailer parks, as well as buildings and other structures. The truck or van can be easily maneuvered to locations adjacent the structures to be cleaned and can be operated independently of facilities available at the site. The unit therefore provides at a relatively low capital investment a complete mobile cleaning apparatus.

Figure 2:
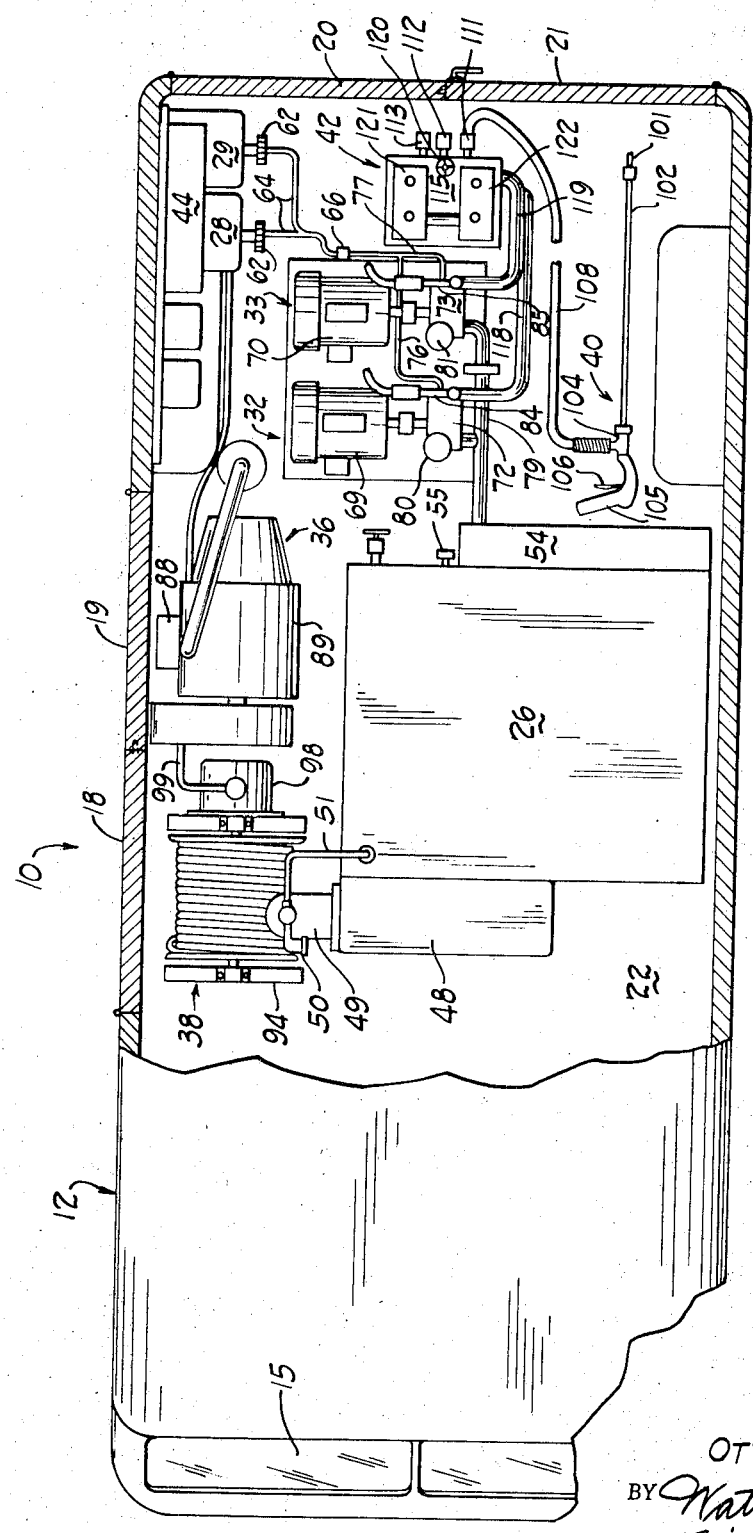

Accordingly, it is an object of this invention to provide a novel and improved self-contained, compact, mobile cleaning unit. Other objects, features and advantages of this invention will become more apparent as the invention becomes better understood from the following detailed description when considered in conjunction with the accompanying drawings, in which:

FIG. 1 is a side elevational view, with parts removed, of a van containing cleaning equipment, embodying the present invention; and FIG. 2 is a top plan view, with parts removed, of the van of FIG. 1.

Referring now to the drawings, a mobile cleaning unit embodying the present invention is indicated generally by the reference numeral 10. The mobile cleaning unit 10 includes a van-type motor vehicle or truck 12 with a chassis 14 including a cab portion 14a and a load carrying portion 14b. The cab portion includes, conventionally, a windshield 15, side windows 16, and doors 17, of a driving compartment. The load carrying portion 14b includes two large side doors 18, 19 on one side of the chassis and two large rear doors 20, 21 at the back of the chassis. These doors 18–21 provide access to equipment within the load carrying portion 14b. The chassis 14 also includes a floor 22 and is supported by front and rear axles and wheels 23, 24, respectively.

Apparatus for carrying water and liquid cleaner and for discharging liquid under pressure at a location remote from the van, is carried in the load carrying portion 14b. Basically, this apparatus includes a water storage tank 26, fluid cleaner containing tanks 28, 29, two electric motor and pump units 32, 33, a generator and engine unit 36, a reel and power cable 38, a spray nozzle or gun 40, pump controls 42 and a main control panel 44.

The water storage tank 26 is secured mid-way between the front and rear axles of the truck. The tank is generally rectangular in plan and elevation, is light in weight, being constructed of 3/16 inch thick aluminum plates heli-arc welded along adjoining edges. Baffles (not shown) within the tank 26 form six separate but communicating compartments which increase the strength of the tank and inhibit sloshing of liquid within the tank during movement of the truck. The tank in the preferred embodiment has a capacity of 270 gallons, which is an adequate supply of water for most tasks.

A float chamber 48 is connected to the storage tank 26 adjacent the front and top, as illustrated in FIGS. 1 and 2. The float chamber 48 communicates with the tank 26 so that the water level in the float chamber is the same as that in the tank 26 when the level in the tank is near the top. A water level control valve 49 is attached to the float chamber 48 and is actuated by a float (not shown) within the chamber 48 in response to the level of water in the float chamber. The valve 49 includes an inlet 50 for filling the chamber and tank, and an outlet conduit 51 that communicates with the tank 26. With this arrangement, the tank 26 is filled by connecting the inlet 50 with a source of water. The valve 49 permits passage of the water from the inlet 50 to the tank 26 through the conduit 51. When the water in the tank 26 and float chamber 48 reaches a predetermined level, the float valve in the chamber closes the control valve 49, preventing the further introduction of wtaer to the tank 26. A water level gauge 52 is provided on the tank 26 to indicate the level and hence the quantity of water contained. It will of course be apparent that liquids other than water can be stored in the tank 26.

A heating unit 54 is connected to the tank 26 at the lower rear portion. The heating unit includes two resistance heaters of 1,000 watt capacity, adequate to maintain the temperature of the liquid in the tank 26 at an initial temperature when ambient temperatures are relatively low, as during the winter season. This permits the tank 26 to be filled with water or other liquid at an initial temperature acceptable for use and then maintains this temperature, without requiring a heating capacity that would be necessary to substantially raise the temperature of cold water, and thereby results in an economical yet effective system. A water temperature gauge 55 connected to the tank 26 indicates the temperature of the liquid within the tank.

The two five-gallon tanks 28, 29 for containing fluid cleaner, such as liquid detergent, are preferably plastic and are supported on a shelf 58 on the side of the truck. Each tank 28, 29 is identical and includes a filling opening 60 at the top and a manually controllable outlet valve 62 adjacent the bottom. Conduits 64 extend from the outlet valves 62 to a solenoid operated control valve 66 and thence to each pump unit 32, 33. By control of the solenoid valve 66 from a remote control switch, which will be described in more detail subsequently, the introduction of liquid detergent from the tanks 28, 29 to the motor driven pump units 32, 33 is selectively controlled from the location where the liquid is being applied. Thus, water mixed with detergent for cleaning, and water for rinsing can be applied through the same hose and nozzle by remotely controlling the solenoid valve 66. The quantity of detergent introduced is controlled by hand operated valves (not shown) on the pump units.

The two electric motor and pump units 32, 33 are identical, and each includes a 3/4 horsepower electric motor 69, 70 that is air cooled by a self-driven fan. Each of the motors 69, 70 drives an identical positive displacement two-cylinder piston pump 72, 73, respectively. The said pumps receive liquid detergent through conduits 76, 77, respectively, from the solenoid control valve 66 and also receive water from a tank 26 through a main 79. Each pump includes a pulse dampener 80, 81 to assure the smooth flow of pumped liquid, and each includes an unloader valve 84, 85, respectively, to permit the pumps to operate continuously, even when liquid is not being released through the spray gun 40. Each pump is capable of supplying liquid at a rate of 2 gallons per minute under a pressure of 500 pounds per square inch gauge.

The generator and gasoline engine unit 36 includes a single cylinder gasoline engine 88 and a 3500 watt generator 89 driven by the engine. The gasoline engine 88 is connected to the fuel supply of the truck so that a separate fuel tank is not required. The engine includes an electric starter that is operated from the truck battery, so that a separate battery is not required. The engine exhaust is channeled through a pipe 90 and a muffler 91 to the outside of the truck, beneath the floor 22. When the engine 88 is operated to drive the generator 89, electricity is generated, conducted through electrical conduits to the control panel 44, and from the control panel is conducted to the water heater, electric motors 69, 70, and other components that require current.

The reel and cable unit 38 provides facilities for connecting the control panel 44 to an external source of electricity to drive the electric motors 69, 70 and supply the other electrical needs of the unit. The reel and cable unit 38 includes a reel 94 supported by a stand 95 adjacent the side door 18 of the truck. The stand 95 is supported on the floor 22 of the truck. A 250 foot, number 10/3, three-wire extension cable 97 is carried by the reel 94 and is connected through the reel to a three pole rotary pick-up 98 that is connected by a cable 99 to the main control panel 44.

Liquid is applied during a cleaning operation through the spray gun 40, which has a nozzle 101 on the end of a tubular wand 102 connected to a valve 104 having a handle 105 and a trigger 106. The trigger 106 operates the valve 104 to control the flow of liquid under pressure through the wand 102 and nozzle 101. A flexible hose 108 is attached to the valve 104 and connects the spray gun 40 to one of three fluid outlets 111, 112, 113 by a quick disconnect coupling. The length of the flexible hose 108 will depend upon the service to which the unit is to be placed, but typically a 60 foot rubber or reinforced rubber hose is suitable.

The fluid outlets 111, 112, 113 extend through a support housing 115, which supports the pump controls 42. The fluid outlets communicate with pump output conduits 118, 119, the conduit 118 being connected with the pump 72 and the conduit 119 being connected with the pump 73. Fluid outlets 111 and 113 are each connected directly to one of the conduits 118, 119, respectively, and a hose 108 connected with either of the outlets 111, 113 will deliver the output of each of the pumps; that is, liquid at the rate of two gallons per minute at 500 pounds pressure. The fluid outlet 112 is connected to both conduits 118, 119 and by operation of a valve handle 120 and valve connected to the conduits in the support housing 115, liquid at the rate of 4 gallons per minute from both pumps 72, 73 can be delivered to the outlet 112 at 500 pounds pressure.

The operation of the pumps 72, 73 is under the control of the pump controls 42. The pump controls 42 include a control 121 and a control 122, respectively, which each have on and off switches and separately control each pump motor. In this manner, the flow of liquid to the outlets 111, 112, 113 can be controlled. By actuating the pump control 121, pump 72 will be operated to supply liquid to fluid outlet 111. By operating pump control 122, pump 73 will be operated to supply liquid to fluid outlet 113. By operating both pump controls 121, 122, the output of both pumps 72, 73 will be supplied either to each respective outlet or, by operation of the aforementioned valve handle, the combined output will be supplied to the fluid outlet 112.

The main control panel 44 and two associated motor controllers 125, 126 are best shown in FIG. 2. Each of the motor controllers 125, 126 includes a circuit breaker and reset button for each of the pump motors 69, 70. On the main control panel 44 two ammeters 128, 129 are provided to indicate the amperage for each motor 69, 70. Also provided are a line voltage meter 130 for indicating input voltage, a generator stop-start switch 132 for the generator 89, a detergent control switch 133 for admitting detergent to the pumps, a remote control receptacle 134 for remotely controlling the detergent through a switch 135 on a cord 136, a two-plug power receptacle 138, a motor and heater function switch 140, an external current and generator function switch 141 and a main breaker switch 142.

In the operation of the unit described above, the initial preparation includes filling the tank 26 with liquid, such as water and mixing a liquid detergent solution and filling the tanks 28, 29. In filling the water tank, the water will automatically shut-off when it reaches the required level. In mixing detergent, one cup of concentrated or powder detergent to each two gallons of water is satisfactory for most washing operations. Controls (not shown) on the pumps 72, 73 are set to introduce between one ounce and ten ounces of detergent liquid per minute, depending upon the job requirements. Typically, one to three ounces of detergent from the tanks 28, 29 is sufficient at flow rates of 2 gallons per minute through the spray gun 40. When operating at four gallons per minute, the setting for detergent should be doubled.

Where external current, such as house current is to be used to operate the unit, the extension cable 97 is plugged into an external 115 volt receptacle and the function switch 141 is set to house current. Alternatively, if the equipment is to be operated by the self-contained generator, the function switch 141 is switched to generator and the generator switch 132 is turned to on position. This operates the motor generator unit 36 to supply current to the operating units. In cold weather, the temperature of the water is maintained by turning the heater function switch 140 to the heater position.

In operation, the spray gun 40 is removed from the truck and the hose 108 is connected to the desired fluid outlet, such as outlet 111. To operate the motors, the function switch 140 is switched to the motor position. Assuming that outlet 111 is to be used, the pump control 122 is actuated by pressing the control button thereof. The unit is now ready to operate at two gallons per minute at 500 pounds pressure and flow is released through the spray gun 40 by actuating the valve trigger 106.

To operate at four gallons per minute and 500 pounds pressure, the two gallon per minute nozzle 101 on the spray gun 40 is changed to a four gallon per minute nozzle. The hose 108 is connected with the fluid outlet 112 and the control handle 120 associated with the support housing 115 is turned to an open position so that the output from the pumps 72, 73 is directed to the outlet 112 rather than to the two outlets 111, 113. The on buttons on both pump controls 121, 122 are pressed to operate both motors 72, 73.

To supply detergent to the liquid being emitted through the spray gun 40, either the control switch 133 on the control panel 44 or the remote control switch 135 is operated to supply detergent at the rate previously set to the pumps 72, 73.

With this construction and arrangement, it will be seen that liquid at high pressure can be supplied with a mobile unit that can be brought to the site of cleaning and which is independent of facilities available at the site. Cleaning liquid as well as rinsing liquid can be supplied and selected by the operator at a position remote from the truck, for maximum convenience. Flows at two different rates can be obtained and two hoses can be used simultaneously. Liquid is supplied at the proper temperature and due to the high pressure efficiency cleans and effectively rinses to provide a complete cleaning operation.

While a preferred embodiment of the present invention has been described with particularity, it will be understood that various modifications or alterations may be made therein without departing from the spirit and scope of the invention.

What is claimed is:

1. In a mobile cleaning unit for spray cleaning vehicles, buildings and the like, said unit comprising a motor vehicle with a load carrying portion, a tank in the load carrying portion for carrying liquid for spray cleaning, a fluid pump in the load carrying portion, an inlet to the pump from the tank, a liquid discharge conduit from the pump, adapted to connect to a spray outlet, an electric motor in the load carrying portion of the vehicle coupled in driving relationship to said pump; a motor-generator unit in the load carrying portion of the vehicle; a reel and electrical cable unit in the load carrying portion of the vehicle adjacent an opening to the load carrying portion, means to connect the electrical cable of said unit to a source of electrical current external to said vehicle, means carried by the vehicle, including a control switch, to selectively connect either the motor-generator unit or the reel and electrical cable unit to said electric motor to operate said pump, said reel and electrical cable unit comprising a reel support on the vehicle, a reel rotatably carried by said support, a cable carried by the reel, a rotary pick-up electrically connecting the electrical cable carried by the reel to a cable within the vehicle connected through said control switch to said electrical motor.

References Cited

UNITED STATES PATENTS

| | | | |
|---|---|---|---|
| 3,086,713 | 4/1963 | Moldenhauer | 239—130 |
| 3,219,137 | 11/1965 | Appleton | 318—139 |
| 3,317,142 | 5/1967 | Casale | 239—130 |
| 3,374,319 | 3/1968 | Stahmer | 191—12.4 |
| 3,380,658 | 4/1968 | Stasz et al. | 239—130 |

CARLTON R. CROYLE, Primary Examiner

J. J. VRABLIK, Assistant Examiner

U.S. Cl. X.R.

417—410